United States Patent [19]

Dickens

[11] Patent Number: 5,669,950

[45] Date of Patent: Sep. 23, 1997

[54] SPOUT FORMING ASSEMBLY AND METHOD THEREFOR

[75] Inventor: Robert R. Dickens, Toledo, Ohio

[73] Assignee: Libbey Glass Inc., Toledo, Ohio

[21] Appl. No.: 587,099

[22] Filed: Jan. 11, 1996

[51] Int. Cl.⁶ .................................................. C03B 23/09
[52] U.S. Cl. .................. 65/29.12; 65/64; 65/102; 65/104; 65/108; 65/158; 65/268; 65/272; 65/276; 65/282; 65/292; 65/299
[58] Field of Search .................... 65/29.1, 29.12, 65/64, 102, 108, 109, 104, 111, 117, 105, 112, 158, 160, 166, 269, 276, 282, 275, 292, 299, DIG. 13, 29.16, 268, 272

[56] References Cited

U.S. PATENT DOCUMENTS

| 214,054 | 4/1879 | Ripley . | |
|---|---|---|---|
| 1,578,427 | 3/1926 | Gray et al. | 65/276 |
| 1,721,983 | 7/1929 | Bailey | 65/299 |
| 1,757,211 | 5/1930 | Parker | 65/272 |
| 2,266,484 | 12/1941 | Weber | 65/276 |
| 2,361,484 | 10/1944 | Lanzinger | 65/268 |
| 2,377,534 | 6/1945 | Wexell et al. | 65/276 |
| 3,203,779 | 8/1965 | Reber . | |
| 5,259,858 | 11/1993 | Inao et al. | 65/102 |

*Primary Examiner*—Steven P. Griffin
*Attorney, Agent, or Firm*—Emch, Schaffer, Schaub & Porcello Co., L.P.A.

[57] ABSTRACT

A spout forming assembly for glassware and a method therefor in which the assembly includes a spout forming device for forming a pour spout on the edge of a piece of glassware, an actuation device for actuating the forming device, and a control device for controlling the actuation device. The method generally includes the steps of: (a) moving a piece of glassware having an edge along a predetermined path; (b) heating the edge; and (c) engaging the edge with forming means to form a spout on the edge of the glassware.

18 Claims, 12 Drawing Sheets

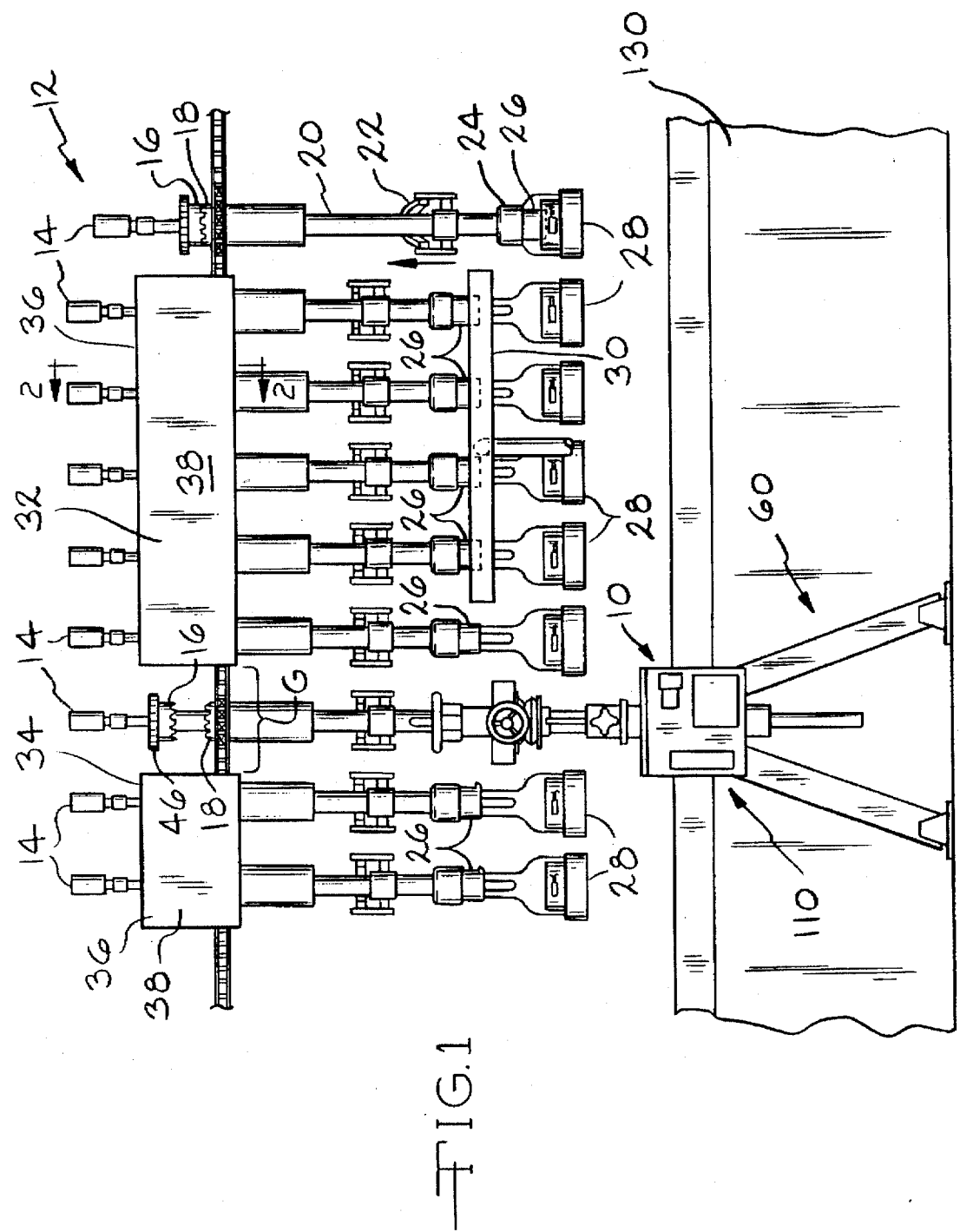

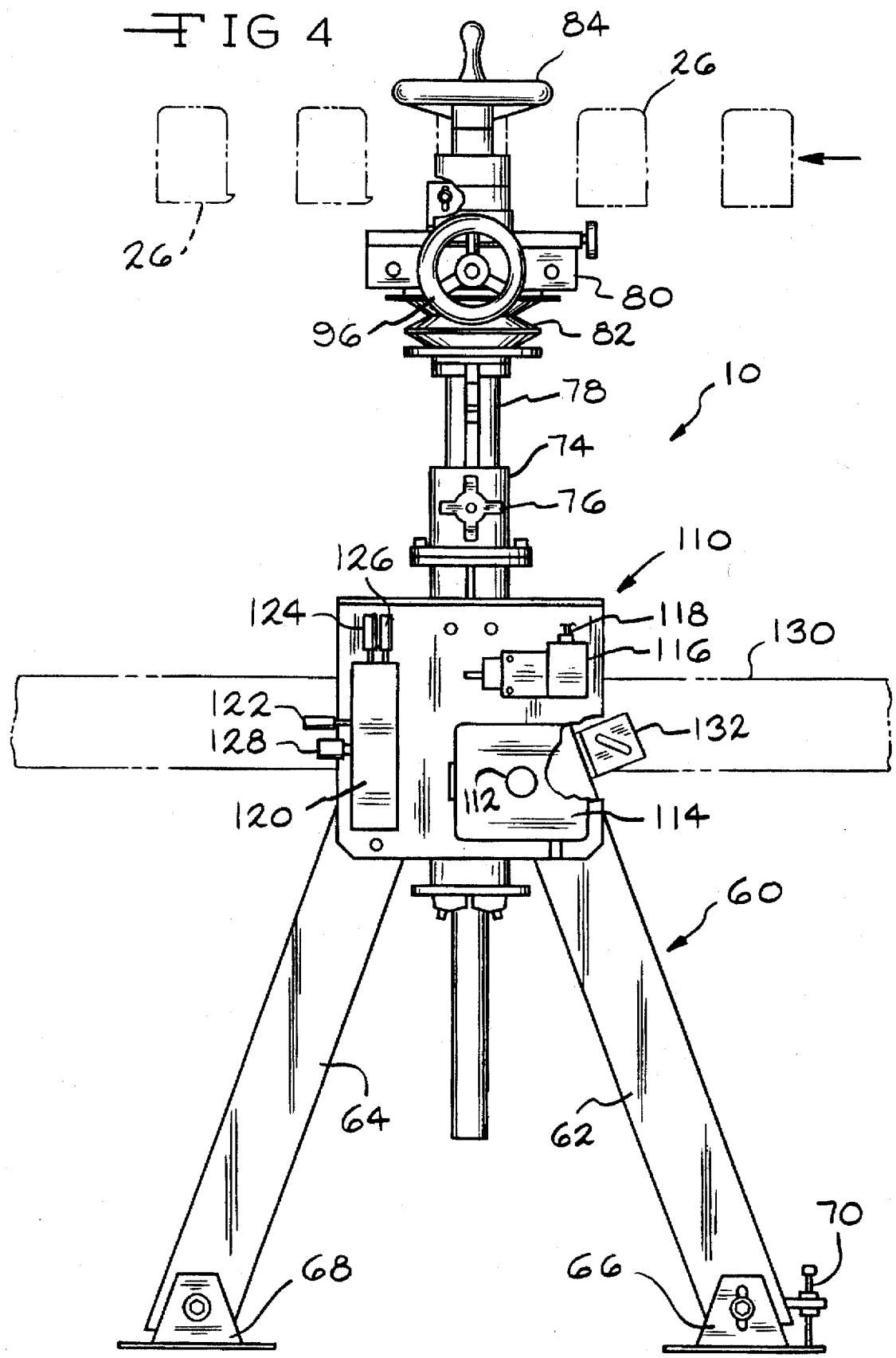

SPOUT FORMING ASSEMBLY AND METHOD THEREFOR

BACKGROUND OF THE INVENTION

The present invention relates to forming a spout on glassware. More specifically, the present invention is directed to an apparatus for forming a spout on the edge of glassware during the production process and a method therefor.

As part of the process for manufacturing glassware, formed glassware is moved to a moil burnoff spindle machine. Conventional spindle machines include twenty-four or thirty-six spindles. The spindles include vacuum chucks that receive and hold the glassware as the spindle machine rotates. The moil or undesired portion of the glassware is burned off by a flame and discarded in the spindle machine.

It has been found that there is a need for a device that can form a spout on the edge of glassware prior to annealing while the glassware is being rotated by the moil burnoff spindle machine. In a prior art process, spouts were formed after the time of annealing. In this process, the edge of a piece of glassware was heated after annealing to form the spout. This process was inefficient because it resulted in a high percentage of breakage. The present invention eliminates this problem.

It has also been found that there is a need for a small, portable and relatively inexpensive spout forming assembly that can be used with any conventional moil burnoff spindle machine. The present invention satisfies these needs.

SUMMARY OF THE INVENTION

The present invention is directed to a spout forming assembly for glassware and a method therefor. The assembly includes a spout forming device mounted on a base adjacent a moil burnoff spindle machine. In a preferred embodiment, the spout forming device can include a roller in communication with an actuation device, such as a pneumatic cylinder. The roller is pivoted so that it can move between an up position and a down position. When a spout is to be formed on a piece of glassware, the cylinder actuates the roller so that it moves from the down position to the up position where the roller engages the edge of the glassware. After the glassware has passed the roller, the cylinder actuates the roller to cause the roller to return to the down position. The roller is then ready for the next piece of glassware.

In another preferred embodiment, a forming arm is in communication with a cylinder. The forming arm is pivotally mounted so that it moves from a down position to an up position. When a spout is to be formed on a piece of glassware, the cylinder actuates the forming arm so that it moves from the down position to the up position where the arm engages the edge of the glassware to form the spout. After the spout is formed, the cylinder causes the forming arm to return to the down position. The forming arm is then ready for the next piece of glassware.

The method of the present invention includes the steps of: (a) moving a piece of glassware having an edge along a predetermined path; (b) heating the edge; and (c) engaging the edge with forming means to form a spout on the edge of the glassware.

The primary object of the present invention is to provide an efficient spout forming assembly and method therefor.

Other objects and advantages of the present invention shall become apparent to those skilled in the art upon a review of the following detailed description of the preferred embodiments and the accompanying drawings.

BRIEF DESCRIPTION OF THE DRAWINGS

FIG. 1 is side elevational view showing the spout forming assembly of the present invention adjacent a moil burnoff spindle machine;

FIG. 4 is front elevational view of the spout forming assembly according to the present invention;

DETAILED DESCRIPTION OF THE PREFERRED EMBODIMENTS

Figures 2, 3:
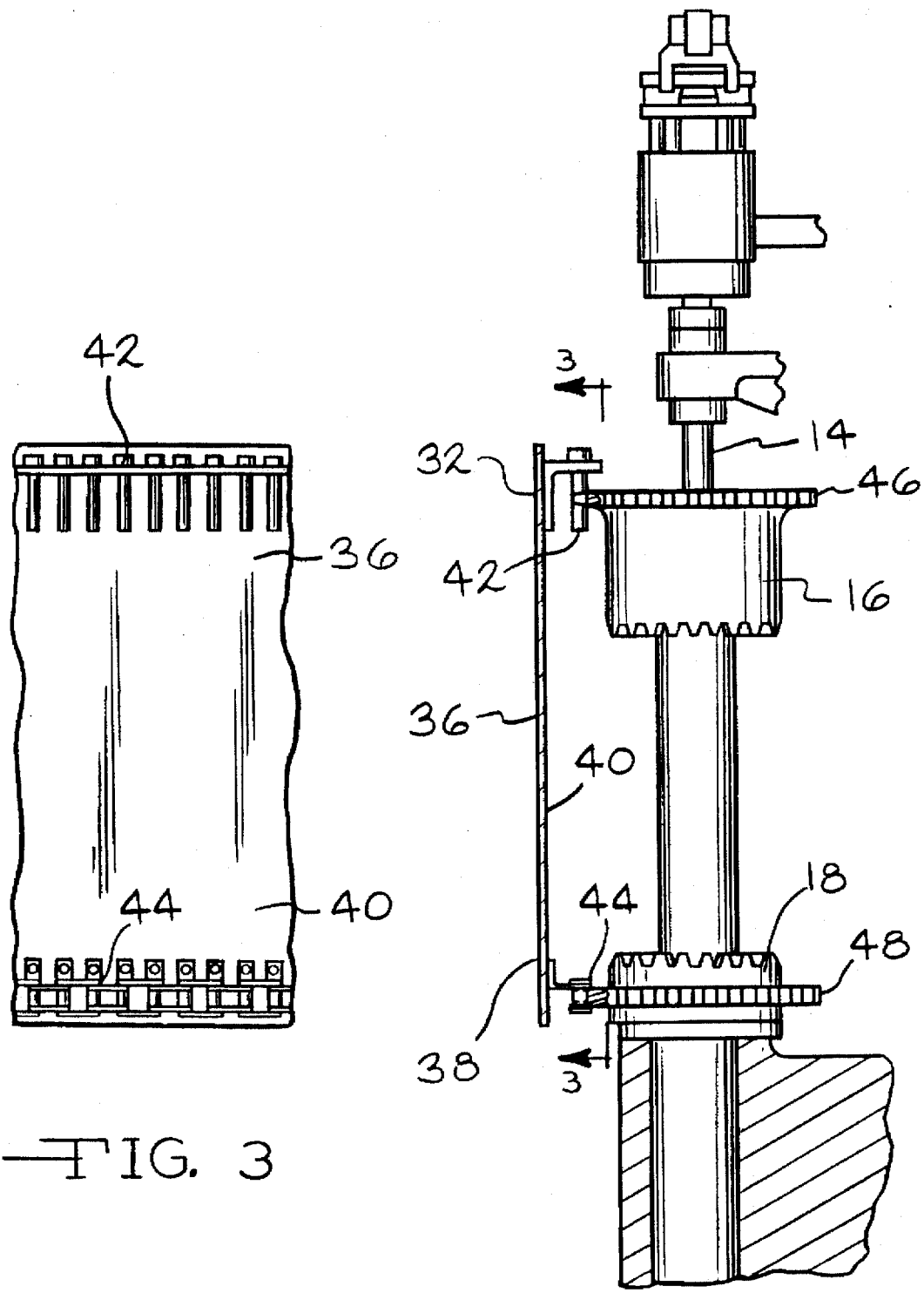
FIG. 2 is cross section view taken through line 2—2 of FIG. 1 showing a spindle and a rotation plate according to the present invention.
FIG. 3 is a detailed view of the rotation plate according to the present invention.

The preferred embodiments and best mode of the present invention will now be described in detail with reference being made to the drawings. The spout forming assembly according to the present invention is indicated generally in the drawings by the reference number "10".

Referring to FIG. 1, the assembly 10 is shown adjacent a moil burnoff spindle machine 12. The spindle machine 12 includes a plurality of spindles 14. Conventional spindle machines include twenty-four or thirty-six spindles that are mounted in a circular arrangement. It should be understood that the present invention can be used with a variety of spindle machines or other devices depending on the application. A spindle 14 is rotated by meshing upper and lower teeth 16 and 18, respectively. A spindle 14 includes a shaft 20. A camming device 22 engages the shaft 20 to cause vertical movement of the spindle 14. The camming device 22 raises the spindle 14 as shown in FIG. 1. The spindle 14 includes a vacuum chuck 24 positioned on the end of the shaft 20. The vacuum chuck 24 is in communication with a source of negative pressure so that a piece of glassware, such as a blown bottle 26, can be positioned and maintained within the vacuum chuck. A plurality of moil burners 28 are positioned adjacent the spindles 14. A moil burner 28 heats the blown bottle 26 to burn off the moil thus leaving an edge on the bottle.

In the present invention, an auxiliary edge heater 30 is positioned adjacent the conventional spindle machine 12 to heat the edge of the blown bottle 26 prior to engagement of the bottle with the spout forming assembly 10. First and second rotation plates 32 and 34 are also positioned adjacent the conventional spindle machine 12. As shown in FIGS. 1, 2 and 3, the first and second rotation plates 32 and 34 each includes a cover plate 36 having a front surface 38 and a back surface 40. The back surface 40 includes a longitudinally extending row of pegs 42 and a longitudinally extending chain belt 44. As the spindle machine 12 rotates a spindle 14 next to the first and second rotation plates 32 and 34, the row of pegs 42 engages a first sprocket 46 and the chain belt 44 engages a second sprocket 48. This engagement of the first and second rotation plates 32 and 34 with a spindle 14 causes rotation of the spindle 14 even though the meshing upper and lower teeth 16 and 18 are disengaged. This allows the blown bottle 26 to continue to rotate as it passes the auxiliary burner 30. In the present embodiment, the blown bottle 26 is rotated between two to four times, with approximately three rotations being preferred, to fully heat the edge of the blown bottle 26 prior to spout formation. As shown in FIG. 1, there is a gap G between the first and second rotation plates 32 and 34 at the point where the spindle 14 is adjacent the assembly 10. In the gap G, the spindle 14 ceases to rotate while a spout is being formed on the blown bottle 26.

As shown in FIG. 1, the camming device 22 lifts the spindle 14 in the direction indicated by the arrow. This causes the blown bottle 26 to be positioned away from the stationary moil burner 28 after the moil has separated so that the bottle can be properly heated by the edge heater 30 and engaged by the assembly 10 to form the spout.

Figure 5:
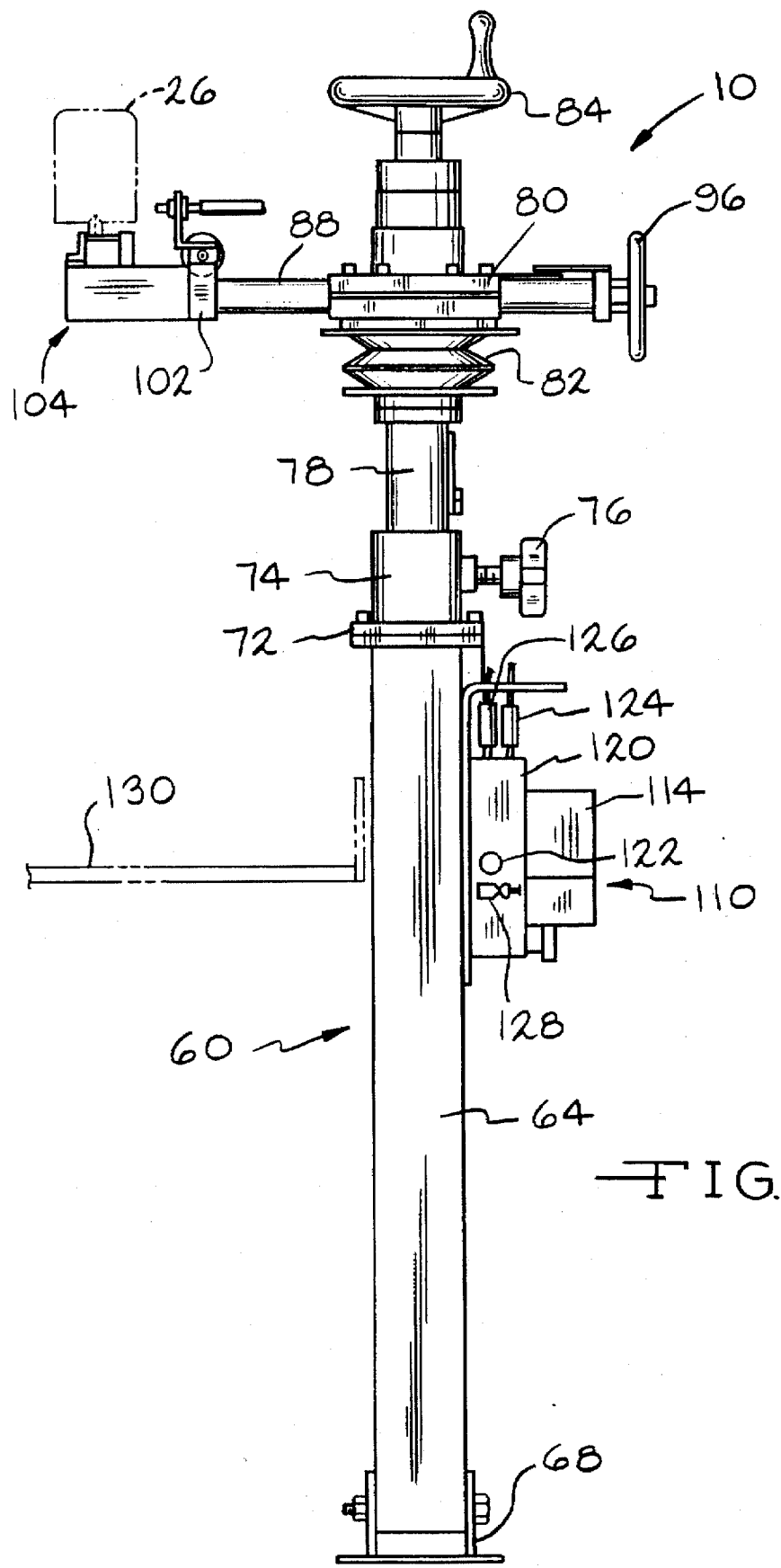
FIG. 5 is a side elevational view of the spout forming assembly according to the present invention.
Figure 6:
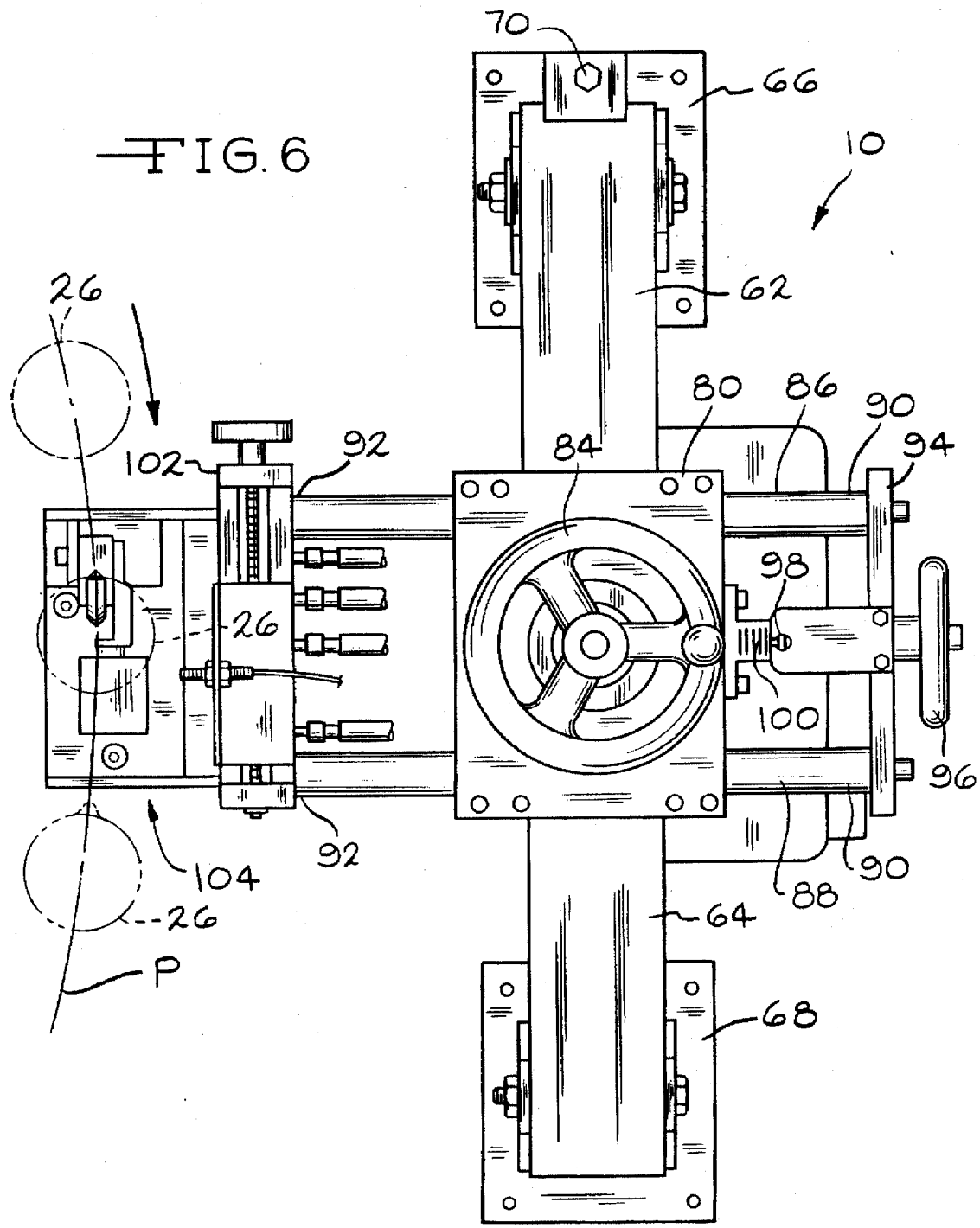
FIG. 6 is a top plan view of the spout forming assembly according to the present invention.

Referring now to FIGS. 4, 5 and 6, the assembly 10 includes a base 60 having a first leg 62 and a second leg 64. The first leg 62 is mounted on a first pivot mounting foot 66. The second leg 64 is mounted on a second pivot mounting foot 68. The mounting feet 66 and 68 are attached to a solid surface, such as a floor. The position of the leg 62 can be adjusted by a leveling screw 70. As shown in FIG. 5, the first and second legs 62 and 64 are joined together by a leg attachment plate 72. A vertical shaft guide 74 having a hand knob 76 is mounted on the leg attachment plate 72. The vertical shaft guide 74 receives a vertical shaft 78. The vertical shaft 78 can be moved vertically within the vertical shaft guide 74. The movement of the vertical shaft 78 can be restrained by turning the hand knob 76. A clamp block 80 is pivotally mounted on the vertical shaft 78 by a pivot assembly 82. The vertical shaft 78 is in operative communication with a vertical hand wheel 84. When the vertical hand wheel 84 is rotated, the vertical shaft 78 can be raised or lowered thus providing vertical movement of the clamp block 80. The pivot assembly 82 allows the clamp block 80 to be rotated away from the spindle machine 12 if the assembly 10 is struck by a spindle 14 or other object during the spout forming process.

Referring to FIGS. 5 and 6, first and second horizontal shafts 86 and 88 are slidingly received by the clamp block 80. The first and second horizontal shafts 86 and 88 each includes a first end 90 and a second end 92. The first ends 90 are fixedly attached to an adjustment block 94. Mounted on the adjustment block 94 is a horizontal hand wheel 96. A horizontal adjustable shaft 98 extends inwardly from the horizontal hand wheel 96 to the clamp block 80. Rotation of the horizontal hand wheel 96 results in the horizontal movement of the first and second horizontal shafts 86 and 88 with respect to the clamp block 80. The relative movement is indicated on the gauge 100. The second ends 92 of the first and second horizontal shafts 86 and 88 are attached to a second adjustment block 102, which is attached to a spout forming device 104. The relative movement of the blown bottles 26 along a predetermined path P with respect to the spout forming device 104 is indicated by the arrow in FIG. 6. As described above, the vertical movement of the clamp block 80 and thus the spout forming device 104 can be adjusted using the vertical hand wheel 84. The horizontal movement of the first and second horizontal shafts 86 and 88 and thus the spout forming device 104 can be adjusted using the horizontal hand wheel 96. These adjustments can be made to properly position the spout forming device 104 with respect to the blown bottles 26.

Referring to FIGS. 4 and 5, a controls assembly 110 is mounted on the base 60. The controls assembly 110 includes an on/off push-button switch 112 mounted in a junction box 114. The controls assembly 110 further includes a sensor module 116 in communication with a fiber cable 118. As described below, the fiber cable 118 is in communication with a photoeye that senses the presence of a blown bottle. The controls assembly 110 further includes a pneumatic control valve 120. A supply of air under pressure is attached to a first air inlet fitting 122. The flow of air is regulated by the pneumatic control valve 120 to a corresponding second air inlet fitting 124, which is in communication with the spout forming device 104. A first exhaust air fitting 126, which is in communication with the spout forming device 104, is in communication with a second exhaust air fitting 128 through the pneumatic control valve 120.

As shown in FIGS. 1, 4 and 5, the spout forming assembly 10 is positioned adjacent a moil receiving pan 130 that is positioned under the spindle machine 12. As shown in FIG. 4, the assembly 10 can be attached to the pan 130 by a mounting bracket 132 that extends from the leg 62.

A first embodiment of the spout forming device 104 is shown in FIGS. 7 through 13. In this embodiment, the spout forming device 104 includes a roller 140, which can be made from a variety of materials with carbon being preferred. The roller 140 can include a variety of geometric shapes, with a round configuration being preferred. The roller 140 is mounted on a roller arm 142 that is in communication with a roller push link 144 by a mounting bolt 146. The roller arm 142 is pivotally mounted on a pivot plate 148 by a pivot bolt 150. The roller push link 144 is in communication with a pneumatic cylinder 152 by a plunger 154. The pivot plate 148 and the cylinder 152 are mounted on a roller base plate 156.

Figure 7:
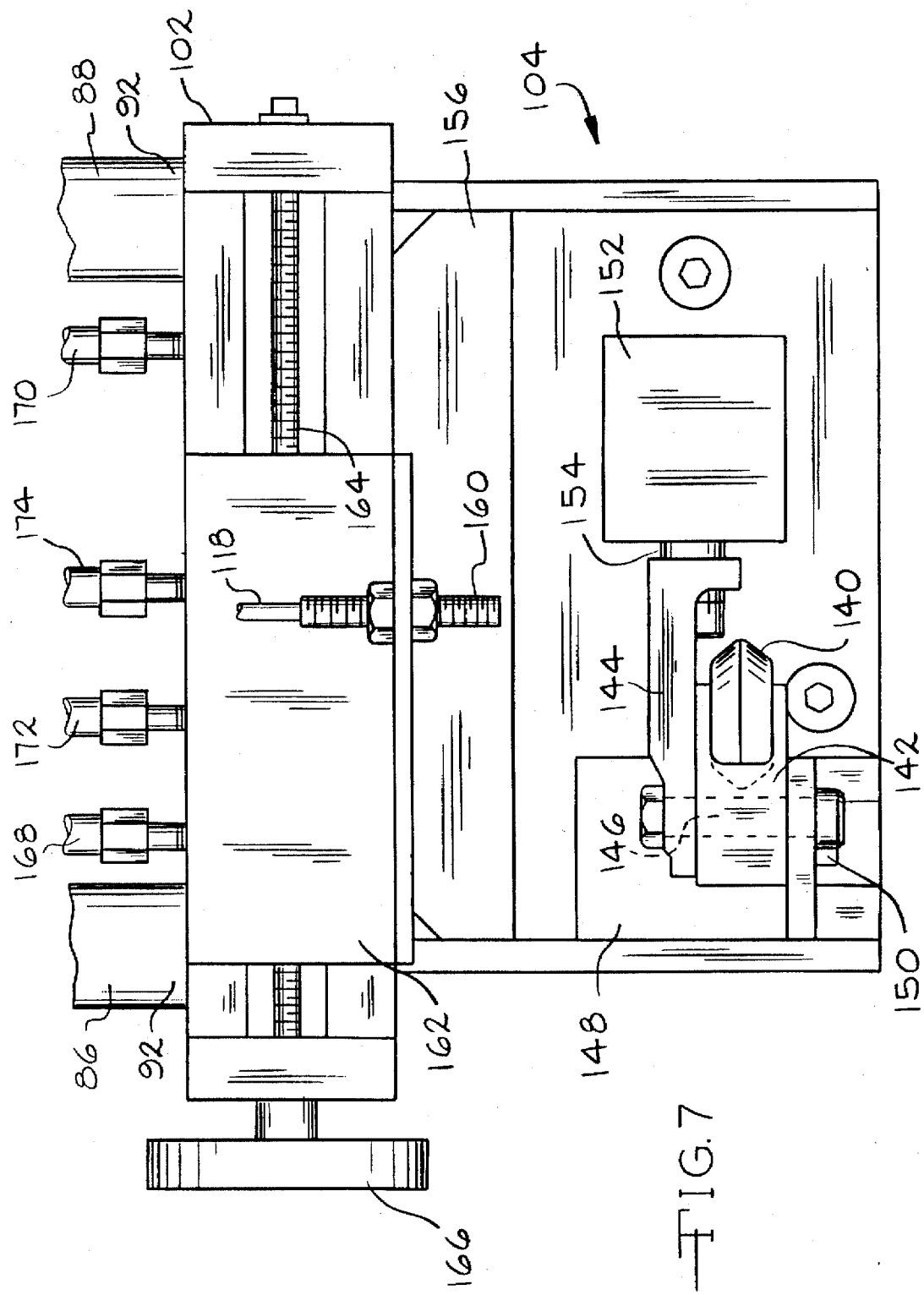
FIG. 7 is a detailed view of a first embodiment spout forming device according to the present invention.
Figure 8:
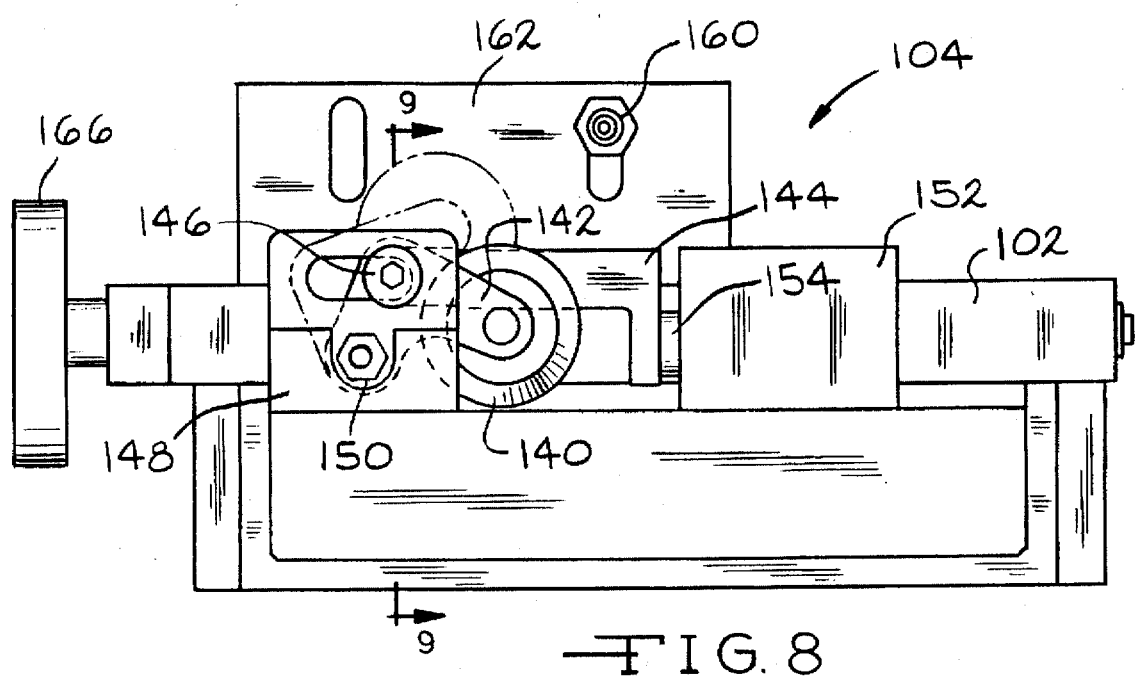
FIG. 8 is a side elevational view of the first embodiment spout forming device.
Figure 9:
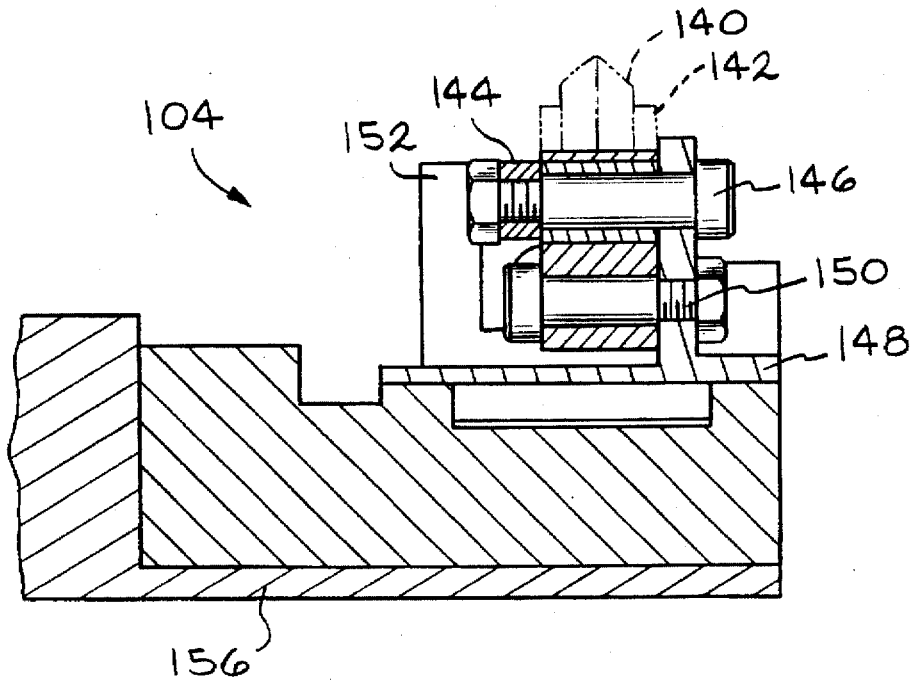
FIG. 9 is a cross sectional view taken through line 9—9 of FIG. 8.

As shown in FIG. 7, the roller base plate 156 is adjacent the second adjustment block 102. An electronic photoeye 160 is slidably mounted on the second adjustment block 102 by a photoeye plate 162. The photoeye 160 is in communication with the previously described fiber cable 118 of the controls assembly 110. The photoeye plate 162 can be moved longitudinally with respect to the second adjustment block 102 by a threaded screw drive 164 that is operatively connected to a photoeye adjustment knob 166. Movement of the knob 166 causes rotation of the screw drive 164 and thus movement of the photoeye plate 162 and the photoeye 160.

As previously described, the second adjustment block 102 and the spout forming device 104 are mounted on the second ends 92 of the first and second horizontal shafts 86 and 88. Positioned between the first and second horizontal shafts 86 and 88 are a coolant inlet fitting 168 and a coolant outlet fitting 170. The coolant inlet fitting 168 delivers a coolant, such as water, to the roller base plate 156. The coolant exits the plate 156 through the coolant outlet fitting 170. Also positioned between the shafts 86 and 88 is a third air inlet fitting 172 and a third exhaust air fitting 174. The fitting 172 is in communication with the previously described fitting 124 of the controls assembly 110. The fitting 174 is in communication with the previously described fitting 126 of the controls assembly 110. The air inlet and exhaust fittings 172 and 174 are in communication with the pneumatic air cylinder 152.

Figure 10:
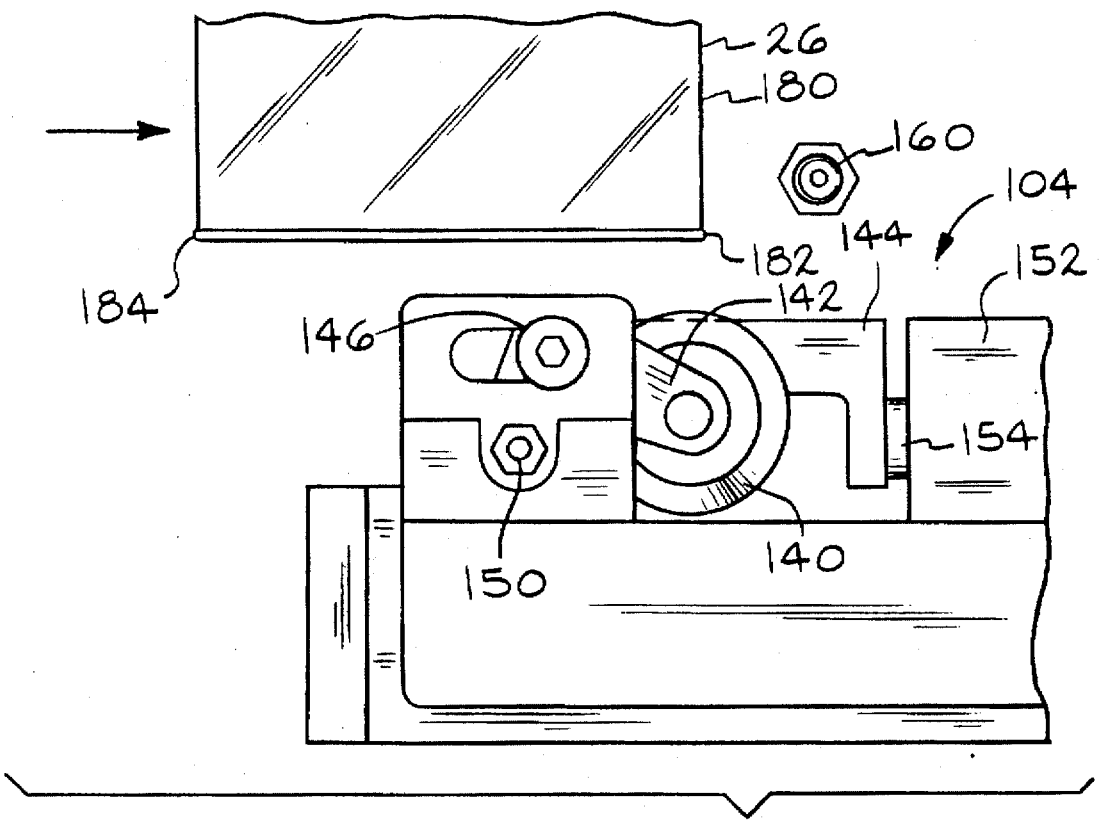
FIG. 10 is a schematic view showing the roller of the first embodiment spout forming device as the leading edge of a piece of glassware passes over the roller in a down position.
Figure 11:
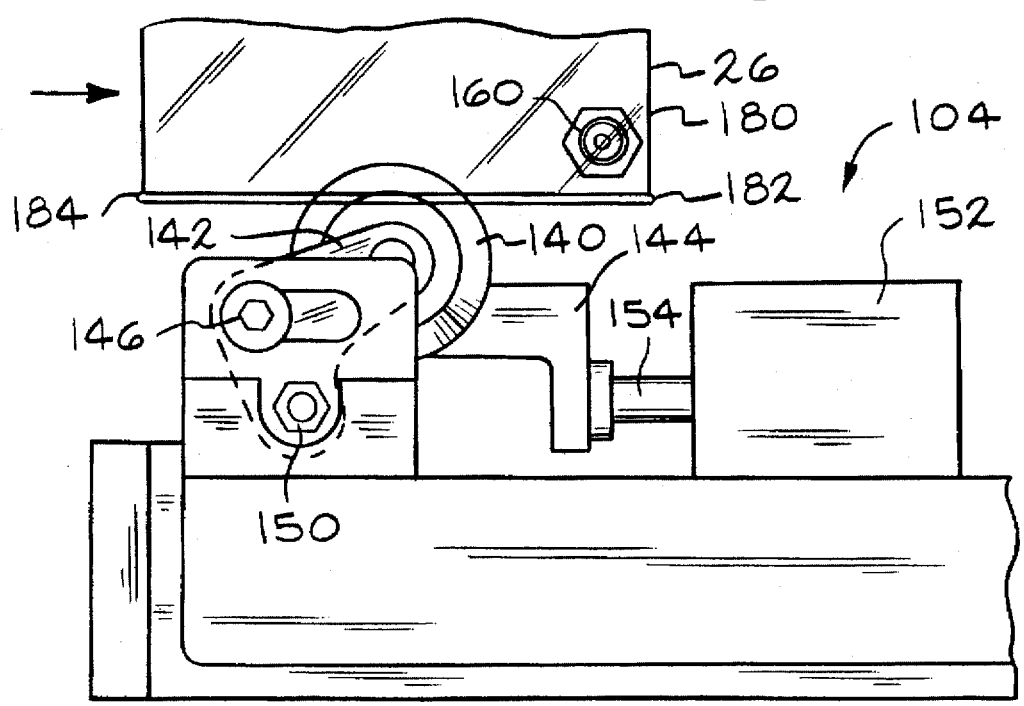
FIG. 11 is a schematic view showing the roller in an up position.
Figure 12:
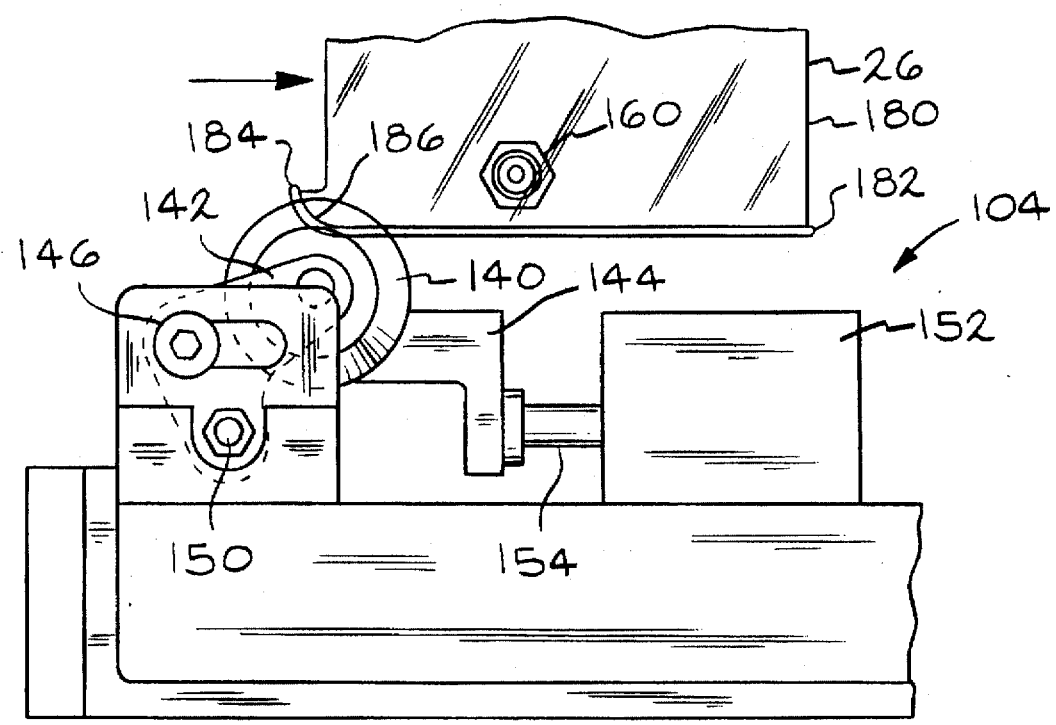
FIG. 12 is a schematic view showing the roller engaging the trailing edge of the glassware.
Figure 13:
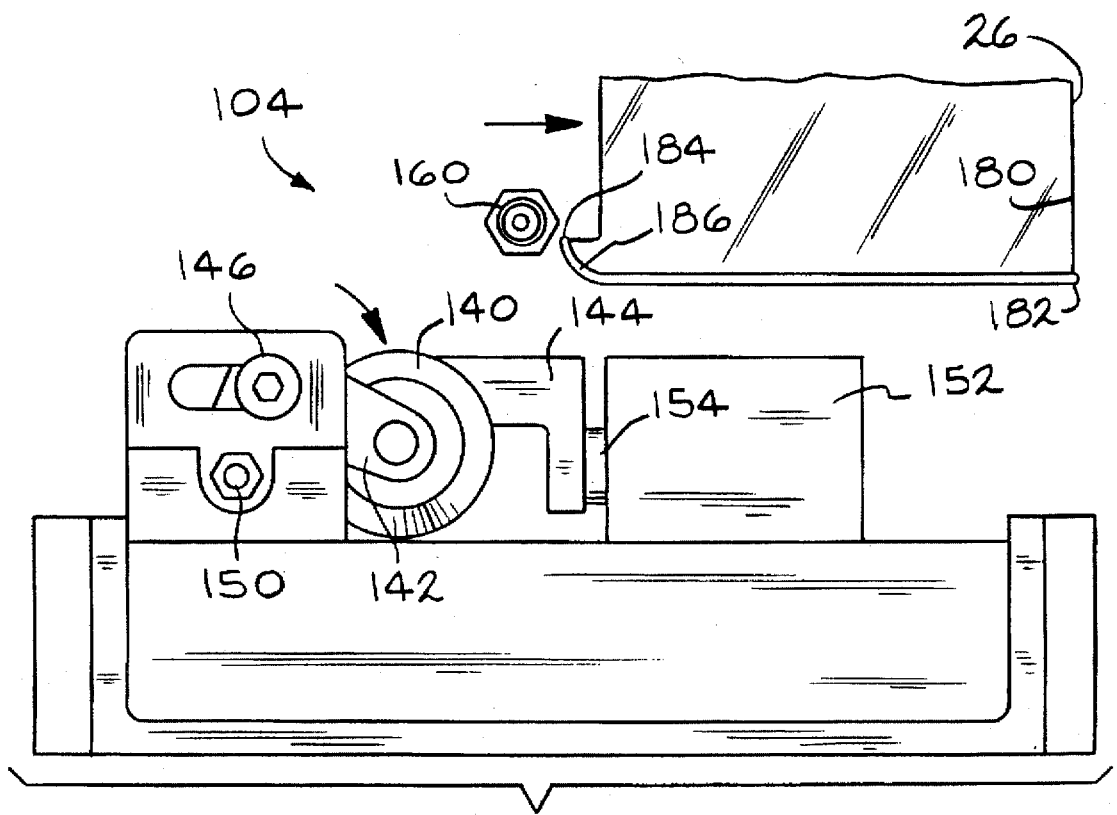
FIG. 13 is a schematic view showing the roller returning to the down position.

Referring to FIGS. 10 through 13, the operation of the assembly 10 and the method of the present invention will be described. As shown in FIG. 10, a piece of glassware, such as blown bottle 26 is moved in the direction indicated by the arrow along a predetermined path. The bottle 26 includes a side wall 180 having a leading edge 182 and a trailing edge 184. As previously described, the side wall 180 and edges 182 and 184 have been sufficiently heated to cause them to become soft. The side wall 180 and edges 182 and 184 can be heated prior to annealing of the edges. It has been found that the side wall 180 and the edges 182 and 184 should be heated to a temperature in the range from about 1500° F. to about 2000° F., with about 1800° F. being preferred. The roller 140 is in the down position to allow the leading edge 182 to clear it. As shown in FIG. 11, the photoeye 160 detects the side wall 180 of the bottle 26 as it moves in the direction indicated by the arrow. The photoeye 160 sends a signal to the controls assembly 110, which causes the pneumatic control valve 120 to open and send air under pressure through the fittings 122, 124 and 172 to the pneumatic cylinder 152. The air actuates the plunger 154 causing the roller push link 144 to act on the mounting bolt 146. This causes the roller arm 142 to pivot on the pivot bolt 150 to raise the roller 140 to the up position as shown in FIG. 11. Referring to FIG. 12, the roller 140 engages the trailing edge 184 of the bottle 26 as the bottle is moved in the direct indicated by the arrow. Engagement of the roller 140 with the trailing edge 184 forms a pour spout 186 on the trailing edge 184. The photoeye 160 sets a dwell time. Once the dwell time has expired, the controls assembly 110 signals the pneumatic control valve 120 to exhaust air through fittings 174, 126 and 128. This results in retraction of the plunger 154, which causes the roller push link 144 to act on the roller arm 142 to lower the roller 140. The spout forming device 104 is ready to repeat the above-described cycle.

Figure 14:
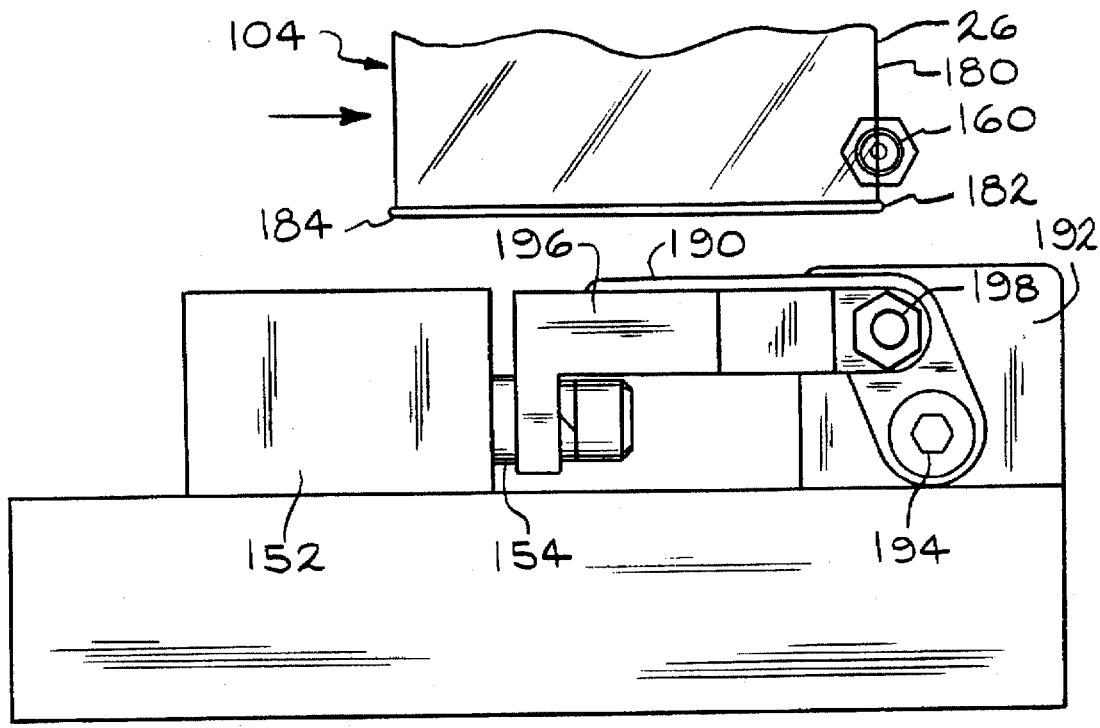
FIG. 14 is a side elevational view showing a second embodiment of the spout forming device according to the present invention that includes a forming arm.
Figure 15:
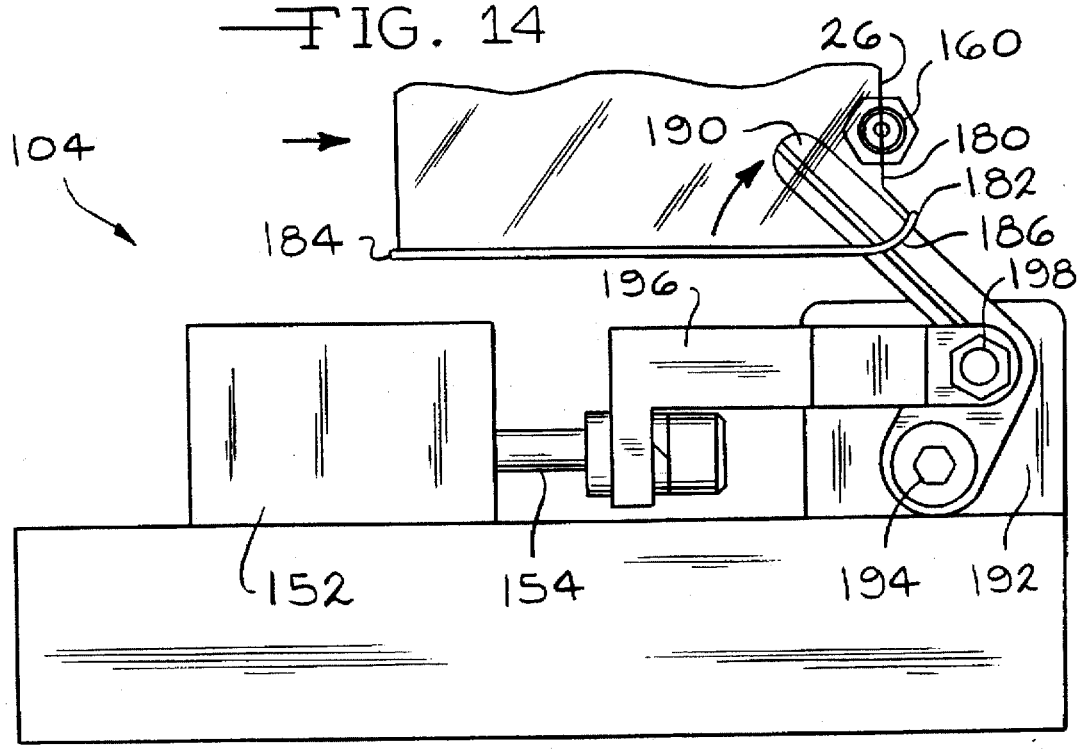
FIG. 15 is a schematic view showing the forming arm engaging the leading edge of a piece of glassware to form a spout.

A second embodiment of the spout forming device 104 is shown in FIGS. 14 and 15. In this embodiment, the device 104 includes a forming arm 190. The arm 190 can be made from a variety of materials, with carbon being preferred. The arm 190 can include a variety of geometric shapes, with an oblong configuration being preferred. The forming arm 190 is pivotally mounted on an arm base plate 192 by a pivot bolt 194. The forming arm 190 is attached to an arm push link 196 by a mounting bolt 198. The arm push link 196 is attached to a plunger 154 of a pneumatic cylinder 152. The operation of the second embodiment of the present invention and the related method is shown in FIGS. 14 and 15. A piece of heated glassware, such as a blown bottle 26, is moved in the direction indicated by the arrow in FIG. 14. The bottle 26 includes a side wall 180, a leading edge 182 and a trailing edge 184. The side wall 180 is detected by the photoeye 160. As previously described, the photoeye causes the controls assembly 110 to actuate the pneumatic cylinder 152 and sets a dwell time. As shown in FIG. 15, the actuation of the pneumatic cylinder 152 causes the plunger 154 to push the forming arm 190 from the down position shown in FIG. 14 to the up position as shown in FIG. 15. Referring to FIG. 15, the forming arm 190 engages the leading edge 182 of the bottle 26 to form a pour spout 186. After the dwell time has expired, the controls assembly 110 causes deactuation of the cylinder 152 resulting in the retraction of the forming arm 190 to the down position as shown in FIG. 14. This allows the trailing edge 184 to clear the forming arm 190. The second embodiment of the spout forming device 104 is then ready to repeat the cycle.

Figure 16:
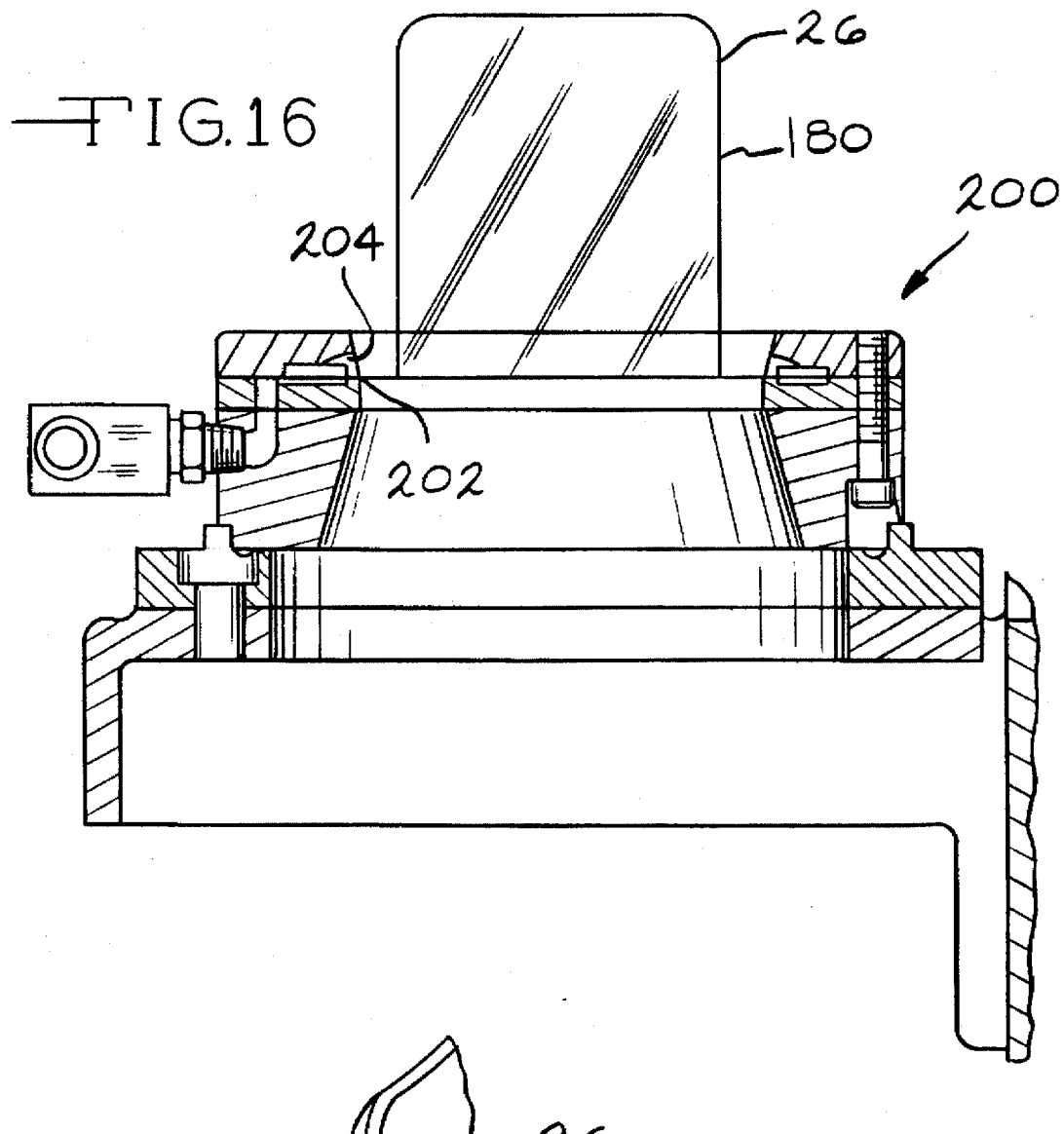
FIG. 16 is a cross sectional view taken through the center of a combined moil burnoff and edge heating burner according to the present invention.
Figure 17:
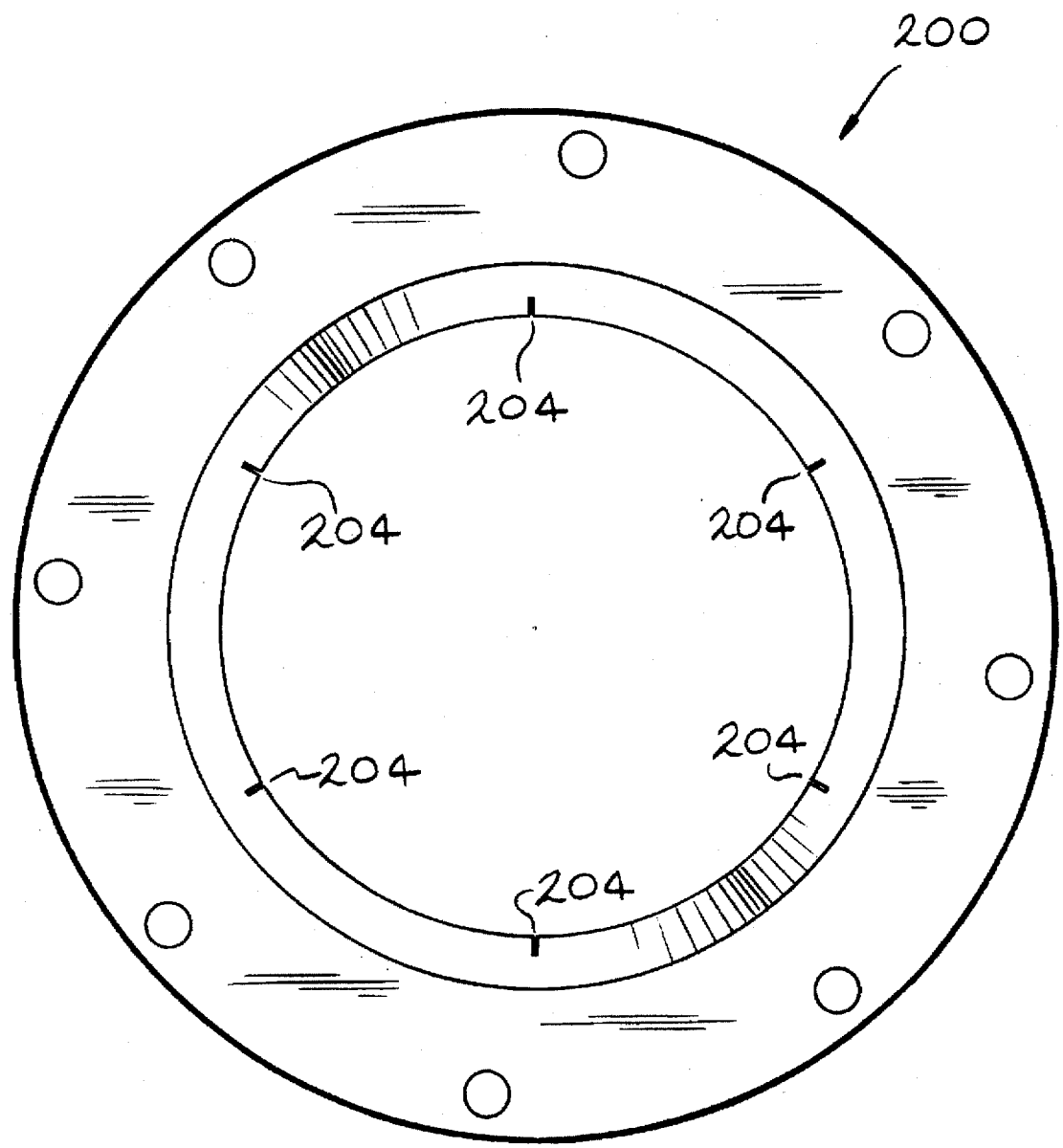
FIG. 17 is a top plan view of the combined moil burnoff and edge heating burner according to the present invention.

As previously described in reference to FIG. 1, an auxiliary edge heater 30 can be used to heat the edge of, for example, a bottle 26 prior to the formation of a pour spout. The auxiliary edge heater 30 is separate from the moil burner 28. An embodiment of a combined moil and edge burner assembly 200 is shown in FIGS. 16 and 17. The burner assembly 200 includes a first slot 202 that provides a flame to burn off the moil (not shown) of the bottle 26. As shown in FIG. 17, the burner assembly 200 further includes a second slot 204 to provide a flame to heat the side wall 180 and the edges 182 and 184 of the bottle 26. After the side wall 180 has been heated, the bottle 26 is lifted from the burner assembly 200 for engagement with the spout forming device 104. As it will be appreciated, the burner assembly 200 makes the overall assembly more efficient because it eliminates the auxiliary edge heater 30.

Figure 18:
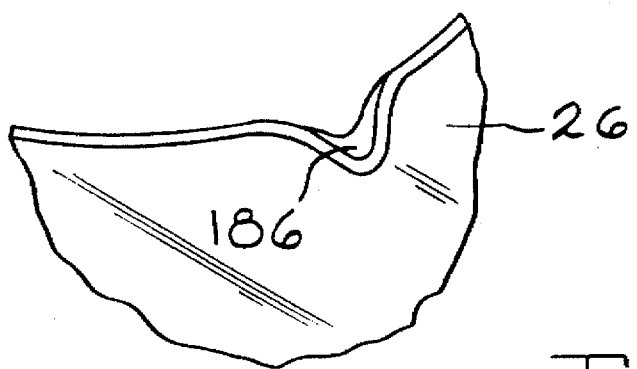
FIG. 18 is a detailed view of the edge of the piece of glassware in which a spout has been formed using the apparatus and method according to the present invention.

Referring to FIG. 18, the spout forming device 104 of the present assembly 10 forms a pour spout 186 on, for example, a bottle 26. It has been found that the roller 140 of the present invention forms a superior pour spout 186 having an angle of approximately 90°. The forming arm 190 of the present invention forms a superior pour spout 186 having an angle of approximately 45°. It should be understood that the present invention can be modified to form pour spouts having a variety of angles.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense.

I claim:

1. A spout forming assembly for glassware having an edge, comprising:

forming means for forming a spout on said edge of said glassware;

actuation means for moving said forming means from a first position to a second position to cause said forming means to engage said edge of said glassware to form said spout; and control means for controlling said actuation means, said control means consisting of a controls assembly having valve means in communication with said actuation means and sensing means in communication with said valve means.

2. The invention of claim 1, wherein said forming means consists of a roller.

3. The invention of claim 1, wherein said forming means consists of a forming arm.

4. The invention of claim 1, wherein said actuation means consists of a cylinder operatively connected to said forming means.

5. The invention of claim 1, wherein said valve means consists of a pneumatic control valve.

6. The invention of claim 1, wherein said sensing means consists of a sensor module in communication with a photoeye positioned adjacent said forming means.

7. The invention of claim 1, wherein said assembly includes base means for supporting said forming means, actuation means and control means.

8. The invention of claim 7, wherein said base means includes adjustment means for moving said forming means in vertical and horizontal directions.

9. The invention of claim 1, wherein said assembly includes a moil burnoff spindle machine including at least one spindle.

10. The invention of claim 9, wherein said assembly includes heater means for heating said edge of said glassware prior to engagement of said edge with said forming means.

11. The invention of claim 10, wherein said assembly includes spindle rotation means for causing rotation of said spindle adjacent said heater means.

12. A spout forming assembly for glassware having an edge, comprising:

forming means for forming a spout on said edge of said glassware;

actuation means for moving said forming means from a first position to a second position to cause said forming means to engage said edge of said glassware to form said spout;

control means for controlling said actuation means;

a moil burnoff spindle machine including at least one spindle; and heater means for heating said edge of said glassware prior to engagement of said edge with said forming means, said heater means including a first slot for providing a moil burnoff flame and a second slot to provide a flame to heat said edge of said glassware.

13. A spout forming assembly for glassware having an edge, comprising:

forming means for forming a spout on said edge of said glassware;

actuation means for moving said forming means from a first position to a second position to cause said forming means to engage said edge of said glassware to form said spout;

control means for controlling said actuation means;

a moil burnoff spindle machine including at least one spindle;

heater means for heating said edge of said glassware prior to engagement of said edge with said forming means; and spindle rotation means for causing rotation of said spindle adjacent said heater means, said spindle rotation means including a row of longitudinally extending pegs and a chain belt, said pegs and said belt engaging said spindle to rotate said spindle.

14. A method of forming a spout on glassware having an edge including the steps of:

(a) moving said glassware along a predetermined path;

(b) heating said edge;

(c) detecting said edge with control means, said control means consisting of a controls assembly having value means in communication with actuation means and sensing means in communication with said valve means;

(d) actuating forming means by said actuation means to move said forming means from a first position to a second position; and (e) engaging said edge with said forming means at said second position to form a spout on said edge of said glassware.

15. The invention of claim 14, wherein said edge is heated to a temperature in the range from about 1500° F. to about 2000° F.

16. The invention of claim 14, wherein said forming means consists of a roller.

17. The invention of claim 14, wherein said forming means consists of a forming arm.

18. The invention of claim 14, wherein said spout is formed prior to annealing of said edge of said glassware.

* * * * *